Figure 1:
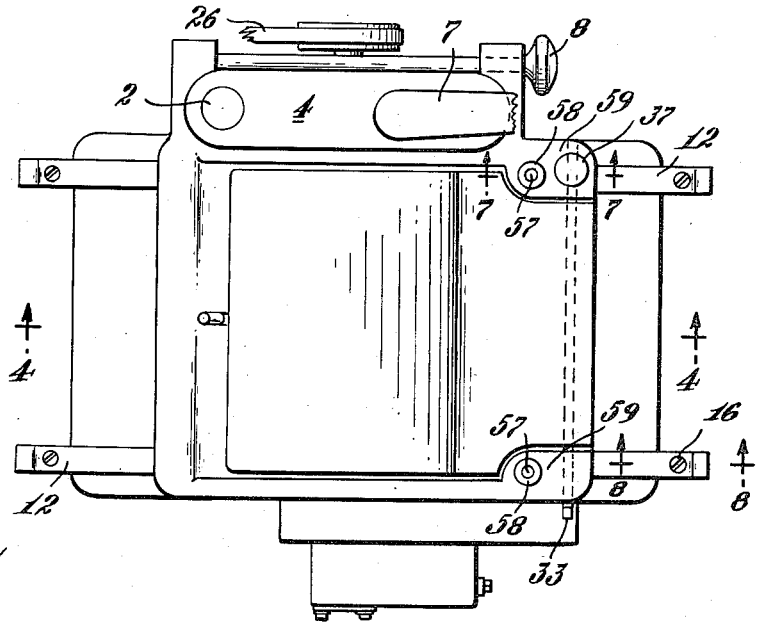

Feb. 5, 1957  T. V. WILLIAMS  2,780,251
WOOD PLANERS AND OTHER CUTTING MACHINES
Filed May 5, 1955  3 Sheets-Sheet 1

Inventor
Thurston V. Williams
by Roberts, Cushman & Grover
Att'ys

Feb. 5, 1957     T. V. WILLIAMS     2,780,251
WOOD PLANERS AND OTHER CUTTING MACHINES
Filed May 5, 1955     3 Sheets-Sheet 3

Inventor
Thurston V. Williams
by Roberts, Cushman & Grover
Att'ys

United States Patent Office 2,780,251
Patented Feb. 5, 1957

2,780,251

WOOD PLANERS AND OTHER CUTTING MACHINES

Thurston V. Williams, Milford, N. H., assignor to Williams & Hussey Machine Corporation, Milford, N. H., a corporation of New Hampshire Application May 5, 1955, Serial No. 506,266

5 Claims. (Cl. 144—130)

This invention relates to machines, such as wood planers, which have a bed over which stock is fed and over the bed a cutter head carrying a cutting rotor for planing or grinding the stock, together with a feed rotor to feed the stock past the cutting rotor, and means for driving the two rotors.

Objects of the invention are to provide a machine which is simple and economical in construction, which can be assembled and disassembled quickly and easily, which is light and compact, which will take light or heavy cuts smoothly and uniformly, which prevents the stock from kicking back, which discharges the chips away from the machine, which fully guards the operator from the cutter, which is simple and easy to operate, which is durable and reliable in use and which is generally superior to prior machines of the type referred to.

In one aspect of the invention the two rotors are kinematically interconnected at one end so that one drives the other, one of the rotors, preferably the cutting rotor, being driven from the other end. In this way the drives for the two rotors do not interfere with each other and there is ample space at one end of the rotors for the adjustable support for the cutting head. Preferably the kinematic drive comprises a worm driven by one rotor, a worm wheel for driving the other rotor, a shaft, a worm wheel on the shaft meshing with the worm, and a worm on the shaft meshing with the worm wheel.

In another aspect the feed roller is movable toward and from the bed about an axis offset from its axis lengthwise of the bed, each end of the roller being journaled in one end of an arm the other end of which is pivotally mounted on the bed to swing about the offset axis. The feed roller is driven by means of a driving element mounted on the bed, a driven element fast to one end of the roller and means kinematically connecting the two elements, the driving element being coaxial with the aforesaid offset axis so that the spacing of the elements remains unchanged as the roller swings about the offset axis.

In still another aspect the invention involves a chip breaker behind the cutter to deflect chips upwardly and forwardly, and means movably supporting the breaker so that it can ride over the stock, the lower edge of the breaker being sharp enough to bite into the stock and having clearance back of the edge to permit it to bite in when the stock tends to move rearwardly, whereby the breaker also serves to prevent stock kickback.

Preferably the upper end of the breaker extends forwardly over the cutter to serve as a guard.

In a more specific aspect the cutter head comprises a rectangular frame having vertical sides parallel with the path of the stock and transverse front and rear ends, the frame having an open top and bottom and the cutter being journaled in the sides intermediate the ends, together with a chip breaker behind the cutter having a rear portion extending forwardly from the rear end at approximately the level of the aforesaid top and, fast to the front end of the aforesaid portion, a deflector portion extending from the rear end upwardly behind the cutter and thence forwardly over the cutter, with means for pivotally supporting the breaker to swing about an axis extending along the junction of the aforesaid top and rear end, and a stop to limit the downward movement of the breaker to a position in which the aforesaid rear portion is approximately horizontal. Preferably the pivotal support for the breaker comprises a rod extending through one of the side walls, thence through said rear portion and thence through the other side wall, and the aforesaid stop comprises an integral lip on the rear wall extending forwardly under the aforesaid rear portion.

Figure 2:
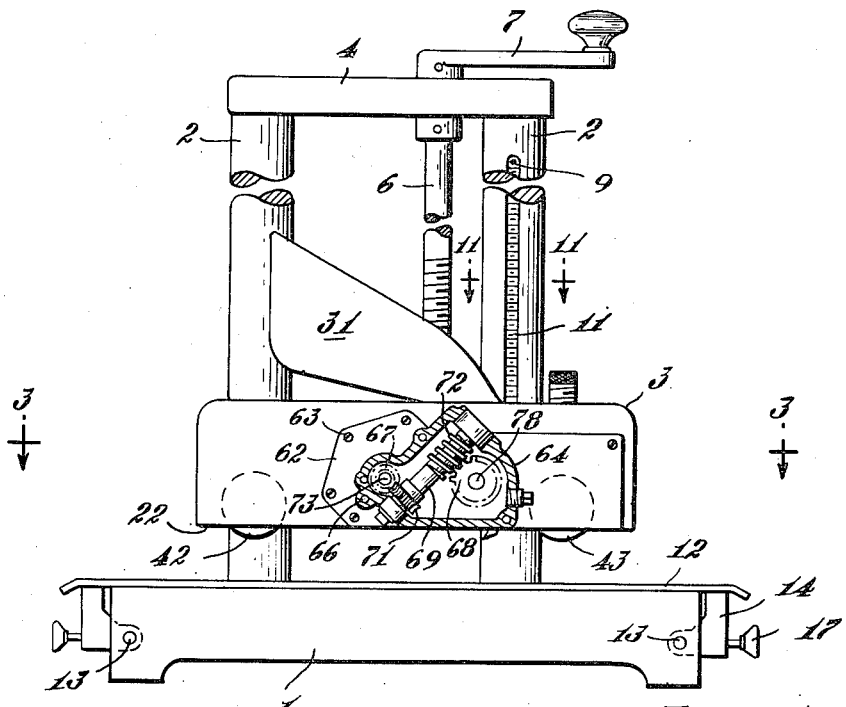
Figure 3:
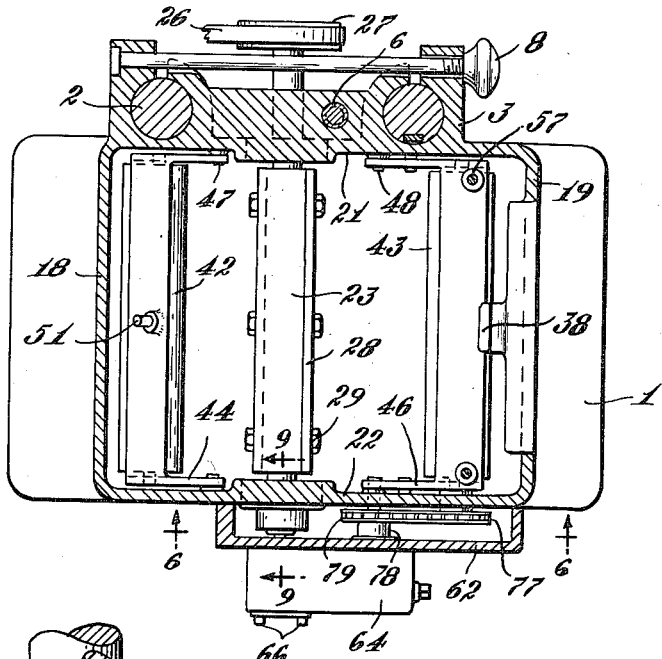
Figure 4:
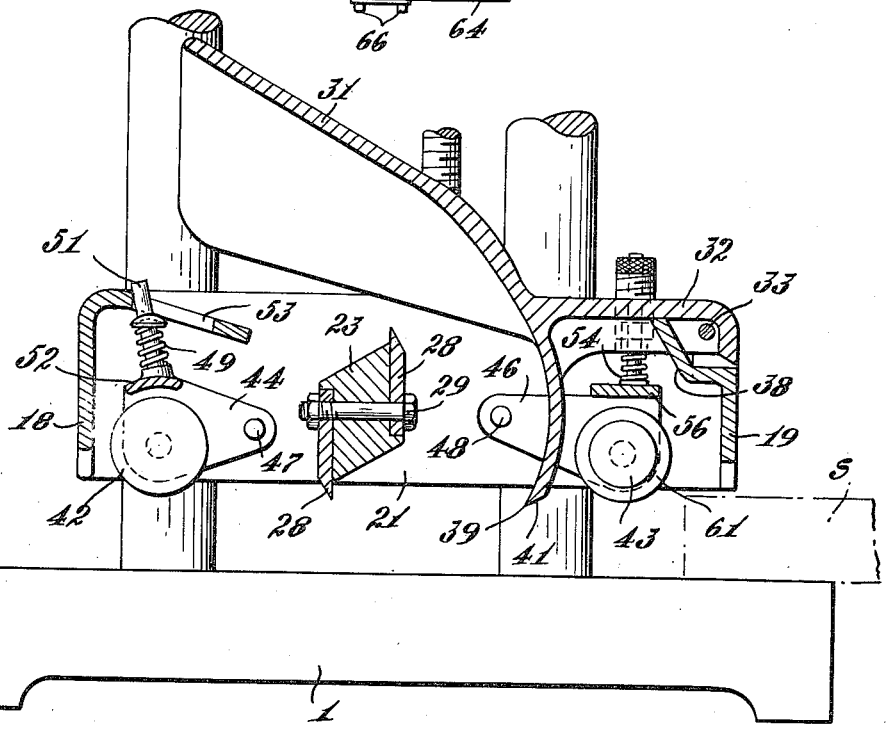
Figure 5:
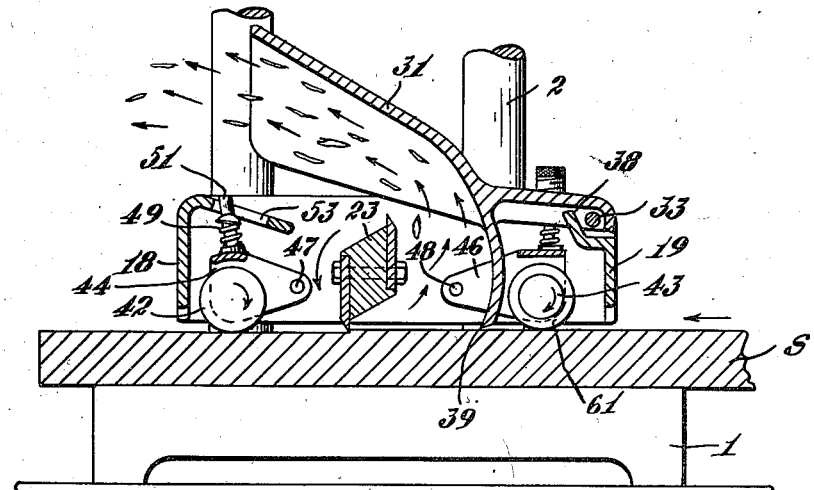
Figure 6:
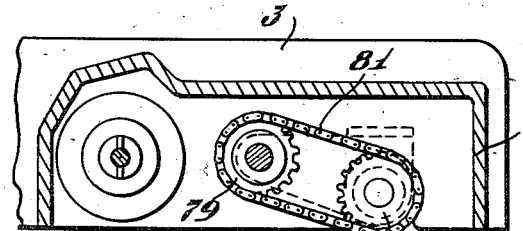
Figure 7:
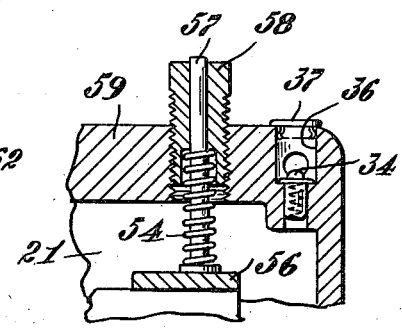
Figure 9:
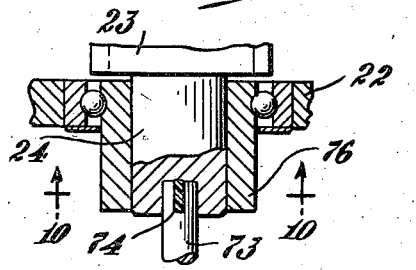
Figure 8:
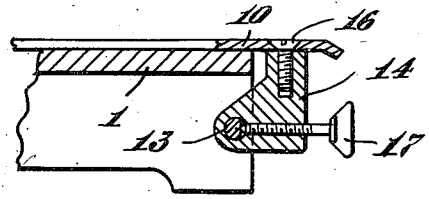
Figure 10:
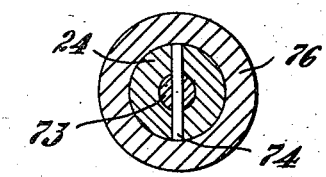
Figure 11:
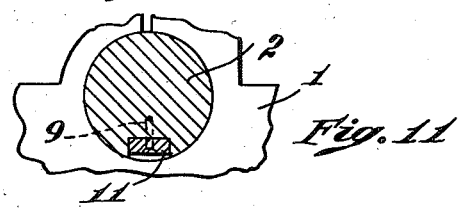

For the purpose of illustration a typical embodiment of the invention is shown in the accompanying drawings in which Fig. 1 is a plan view of a thickness planer;
Fig. 2 is a side elevation with a part in section;
Fig. 3 is a section on line 3—3 of Fig. 2;
Fig. 4 is a section on line 4—4 of Fig. 1;
Fig. 5 is a section similar to Fig. 4 showing the machine in operation;
Fig. 6 is a section on line 6—6 of Fig. 3;
Fig. 7 is a section on line 7—7 of Fig. 1;
Fig. 8 is a section on line 8—8 of Fig. 1;
Fig. 9 is a section on line 9—9 of Fig. 3;
Fig. 10 is a section on line 10—10 of Fig. 9; and
Fig. 11 is a section on line 11—11 of Fig. 2.

The particular embodiment of the invention chosen for the purpose of illustration comprises a bed 1 over which the stock S is fed (Fig. 5), posts 2 extending upwardly from one side of the bed, a cutter head 3 slidable up and down on the posts 2, a cross-piece 4 interconnecting the upper ends of the posts, a screw 6 journaled in the cross-piece and threaded into the cutter head as shown in Fig. 3 for raising and lowering the cutter head, a handle 7 for actuating the screw and a bolt 8 for locking the cutter head in adjusted position on the posts. As shown in Figs. 2, 3 and 11 one of the posts has a longitudinal recess in one side and mounted in the recess by means of two screws 9 is a scale 11, the scale being disposed wholly within the outline of the post so as not to interfere with the sliding head and being calibrated to indicate the distance between the bed and the head by the position of the upper surface of the head in relation to the scale. The arrangement of this scale is described and claimed in the copending application of Percy Leonard, Serial No. 506,251, filed on even date herewith.

To guide stock over the bed, guides 12 are adjustably mounted on rods 13 extending transversely under each end of the bed. As shown in Figs. 1, 2 and 8 the guides are mounted on the rods by means of L-shaped brackets 14 with screws 16 extending through the ends of the guides into the vertical legs of the brackets. The guides are locked in adjusted position by means of screws 17 threaded lengthwise through the lower legs of the brackets into engagement with the rods 13. This guide arrangement is described and claimed in copending application of Percy Leonard, Serial No. 506,252, filed on even date herewith.

As shown in Figs. 3 and 4 the cutter head has a front wall 18, a rear wall 19 and side walls 21 and 22, the top and bottom of the head being open. Inside the head is a cutter 23 having trunnions 24 journaled in the side walls by means of ball bearings (Fig. 9). The cutter may be rotated in any suitable way, as for example by means of a belt 26 trained over a pulley 27 on one of the trunnions. As shown in Figs. 4 and 5 the cross-sectional outline of the cutter 23 is a parallelogram and the blades 28 are mounted in recesses, with their edges projecting beyond the acute corners of the parallelogram, by means of bolts 29 extending through openings which intersect the blade recesses equidistantly from the obtuse corners of the parallelogram so that each bolt may serve to secure each blade and the blades may be identical. This cutter is described and claimed in a copending application of Lucius W. Grotto, Serial No. 506,167, filed on even date herewith.

Disposed over the cutter is a hood 31 which serves both as a chip breaker to direct the chips out of the machine (Fig. 5) and also as a guard to protect the operator from the cutter. The hood has a flange portion 32 extending rearwardly at the level of the upper open end of the cutter head and the rear end of this portion is pivotally mounted on the side walls 21 and 22 of the cutter head by means of a pin 33 which extends through the side wall 22 and thence into the side wall 21 where it is held by spring detent 34 (Fig. 7) disposed in a recess 36 covered by a cap 37. Projecting forwardly and upwardly from the rear wall 19 under the horizontal portion 32 of the hood is a lip 38 which limits the counterclockwise movement of the hood to the position shown in Fig. 4. The lower end of the hood 31 extends slightly below the lowermost point of the cutter path so that it rests on the stock (Figs. 4 and 5) and behind the edge 39 the lower end of the hood is beveled to provide clearance so that the edge 39 can bite into the stock in case the stock tends to kick back.

To hold the stock against the bed as it is fed through the machine, front and rear rollers 42 and 43 are journaled in arms 44 and 46 which are pivotally mounted on the side walls 21 and 22 at 47 and 48 to swing about axes offset lengthwise of the bed relatively to the axes of the rollers respectively. The front roller is yieldingly held down against the stock by means of a spring 49 around a pin 51 which projects upwardly from the cross bar 52 which interconnects the two arms 44 through a slot 53 in a flange on the front wall 18. The rear roller is yieldingly held down against the stock by means of two springs 54 which bear on the cross-piece 56 which interconnects the two arms 46. Each spring is held in position by means of a pin 57 (Fig. 7) extending upwardly through a cap 58 which is threaded through an internal flange 59 on the side walls 21 and 22. Either of the spring holddowns for the rollers 42 and 43 may be replaced by the other construction or by any other substitute construction. Either of the rollers 42 and 43 may be power driven and in the illustration the rear roller 43 is so driven, and when so driven it is preferably provided with a rubber covering as shown at 61 in Figs. 4 and 5.

According to this invention the drive roll is driven through the rotary cutter or vice versa, and in the illustration the drive roll 43 is driven through the cutter 23 by kinematic means located in a housing on the left side of the machine comprising an inner part 62 secured to the side 22 of the cutter head by means of screws 63 and an outer part 64 secured to the inner part by means of screws 66. The drive means comprises a worm 67 driven by the cutter and a worm wheel 68 fast to the end of the drive shaft 78, the two being interconnected by a shaft 69 carrying a worm wheel 71 meshing with the worm 67 and a worm 72 meshing with the worm wheel 68, the ends of the shaft 69 being journaled in the casing 64. The worm 67 is mounted on a shaft 73 which is coupled to the cutter trunnion 24 as shown in Fig. 9. This coupling comprises a fiber key 74 extending through aligned radial slots in the ends of the shaft and trunnion, the key 74 being retained in position by the inner raceway 76 of the ball bearings for the trunnion 24 which overlaps the ends of the key.

The left-hand trunnion of the drive roller 43 projects out through a slot in the left wall 22 of the cutter head and on its outer end, within the housing 62, carries a sprocket wheel 77 (Fig. 6). Journaled in the left wall of the casing 62 is the aforesaid shaft 78 which carries on its inner end a sprocket wheel 79 interconnected with the sprocket wheel 77 by a chain 81, the worm wheel 68 being mounted on the left end of the shaft 78 within the housing 64. The shaft 78 is coaxial with the pivot pins 48 of the arms 46 which support the driving roller. Thus as the roller rides up on the stock the distance between the two sprocket wheels 77 and 79 remains unchanged.

By locating the shaft 69 obliquely between the worm 73 and worm wheel 68 as shown in Fig. 2 the drive means may be encompassed within a small space. And by providing the kinematic interconnection between the cutter and drive roll at the side of the machine opposite to the side from which the cutter is driven by belt 26, more space is provided for both and for the mechanism for raising the cutter head 3.

It should be understood that the present disclosure is for the purpose of illustration only and that this invention includes all modifications and equivalents which fall within the scope of the appended claims.

I claim:

1. A cutting machine comprising a bed over which stock is fed, a cutter head above the bed, a feed roller bearing on the stock to feed it over the bed, a support arm at each end of the roller for pivotally supporting the roller on said head to swing toward and from the bed about an axis offset from the roller lengthwise of the bed, the roller being journaled in said arms, a driving element mounted on said head, a driven element fast to one end of said roller, and means kinematically interconnecting said elements for driving the roller, said driving element being coaxial with said axis so that the spacing of said elements remains unchanged as the roller swings about said axis.

2. A cutting machine comprising a bed over which stock is fed, a cutter above the bed to remove material from the upper side of the stock, the cutter rotating in the direction opposite to the stock feed, a chip breaker behind the cutter to deflect chips upwardly, and means movably supporting the breaker so that it can ride over the stock, the lower edge of the breaker being sharp enough to bite into the stock and having clearance back of the edge to permit it to bite in when the stock tends to move rearwardly, whereby the breaker also serves to prevent stock kick-back.

3. A cutting machine comprising a bed over which stock is fed, a cutter above the bed to remove material from the upper side of the stock, the cutter rotating in the direction opposite to the stock feed, a chip breaker behind the cutter to deflect chips upwardly, and means movably supporting the breaker so that it can ride over the stock, the lower edge of the breaker being sharp enough to bite into the stock and having clearance back of the edge to permit it to bite in when the stock tends to move rearwardly, the upper end of the breaker extending forwardly over the cutter to serve as a guard.

4. A cutting machine comprising a bed over which stock may be fed along a predetermined path, above the bed a rectangular frame having vertical sides parallel with said path and transverse front and rear ends, the frame having an open top and bottom, a rotary cutter journaled in said sides intermediate said ends, a chip breaker behind the cutter, said breaker having a rear portion extending forwardly from the rear end at approximately the level of said top and, fast to the front end of said portion, a deflector portion extending from near the bed upwardly behind the cutter and thence forwardly over the cutter, means for pivotally supporting the breaker to swing about an axis extending along the junction of said top and rear end, and a stop to limit the downward movement of the breaker to a position in which said rear portion is approximately horizontal.

5. A cutting machine comprising a bed over which stock may be fed along a predetermined path, above the bed a rectangular frame having vertical sides parallel with said path and transverse front and rear ends, the frame having an open top and bottom, a rotary cutter journaled in said sides intermediate said ends, a chip breaker behind the cutter, the breaker having a rear portion extending forwardly from the rear end at approximately the level of said top and, fast to the front end of said portion, a deflector portion extending from near the bed upwardly behind the cutter and thence forwardly over the cutter, means for pivotally supporting the breaker to swing about an axis extending along the junction of said top and rear ends, said means comprising a rod extending through one of said side walls, thence through said rear portion and thence into the other side wall, and a stop to limit the downward movement of the breaker to a position in which said rear portion is approximately horizontal, said stop comprising an integral lip on said rear wall extending forwardly under said rear portion.

References Cited in the file of this patent

UNITED STATES PATENTS

| | | | |
|---|---|---|---|
| 384,445 | Hoyt | June 12, | 1888 |
| 515,313 | Blaisdell | Feb. 20, | 1894 |
| 750,125 | Ross | Jan. 19, | 1904 |
| 887,021 | Thomas | May 5, | 1908 |
| 2,577,975 | Moore | Dec. 11, | 1951 |
| 2,597,398 | Stearns | May 20, | 1952 |
| 2,624,382 | Moore | Jan. 6, | 1953 |
| 2,687,153 | Moore | Aug. 24, | 1954 |